UNITED STATES PATENT OFFICE.

PERCY A. BOECK, OF NEW YORK, N. Y., AND WALTER L. JORDAN, OF GLENDALE, CALIFORNIA.

HEAT-INSULATING MATERIAL AND METHOD FOR MANUFACTURING SAME.

1,279,975. Specification of Letters Patent. Patented Sept. 24, 1918.

No Drawing. Application filed March 12, 1918. Serial No. 221,964.

*To all whom it may concern:*

Be it known that we, PERCY A. BOECK, a citizen of the United States, and a resident of the city of New York, borough of Manhattan, in the county and State of New York, and WALTER L. JORDAN, a citizen of the United States, and a resident of Glendale, in the county of Los Angeles and State of California, have invented a new and Improved Heat-Insulating Material and Method for Manufacturing Same, of which the following is a full, clear, and exact description.

Our invention relates to a heat-insulating composition adaptable for lining, and particularly for covering, heat-conserving, generating or transmitting contrivances.

An object of the invention is to provide an inexpensive heat-insulating composition formed of diatomaceous earth, basic magnesium carbonate, and a fibrous binder, in which some of the magnesia enters into chemical combination with the silica of the diatomaceous earth to form a silicate and thereby increases the strength of the resulting composition and also renders the same suitable for a lining exposed to high temperature.

We are well aware that mixtures of diatomaceous earth and magnesium carbonate have been previously suggested, but the resulting mixtures have never been shown to contain silicate of magnesia at normal temperatures. This was probably due to a different method of combining the ingredients and also because magnesium carbonate was used in place of hydrated basic magnesium carbonate. Ordinary magnesium carbonate does not combine with silica except at a temperature high enough to convert carbonate to oxid, and, therefore, there is no bonding action between the diatomaceous earth and magnesia at lower temperature.

The advantage of using the hydrated basic magnesium carbonate is that it is much more active and combines with the form of silica found in diatomaceous earth at about boiling temperature, and its strength increases on exposure to higher temperatures above red heat, which is probably due to the further interaction or combination of the magnesia with the silica of the diatomaceous earth. Therefore, our composition is an improvement over the ordinary hydrated basic magnesium carbonate, which, it is well known, disintegrates at high temperatures.

The hydrated basic magnesium carbonate may be produced in the ordinary way that is, by boiling a solution of the acid magnesium carbonate, ordinarily known as magnesium bicarbonate. Boiling drives off the carbon dioxid and basic magnesium carbonate is precipitated having approximately the formula described in Navy specification 32L1B of March 2, 1914. To this precipitate of hydrated basic magnesium carbonate diatomaceous earth and fiber are added as soon as possible after the precipitation of the magnesia, and while the liquor is still hot, as this heat promotes the combination of the magnesia and silica. The advantage of adding diatomaceous earth to the hydrated basic magnesium carbonate is that the precipitate does not need to be thickened by filtering, as is common to get a sludge of the magnesium carbonate suitable for molding. In other words, a diluted suspension of the hydrated basic carbonate can be used, for the addition of diatomaceous earth will render the mass just suitable for molding.

It is a well known fact that the rehandling of hydrated basic magnesium carbonate causes it to become denser. This is due to the breaking up of the aggregated crystals or particles. Therefore, the addition of the diatomaceous earth to the hydrated basic carbonate in suspension will give a lighter product suitable for immediate use in molding. It may be remarked that it is of advantage to add diatomaceous earth to a solution of magnesium bicarbonate just prior to the precipitation of the hydrated basic magnesium carbonate. It obviates entirely the handling of the basic hydrated magnesium carbonate and allows the precipitation of the hydrated basic magnesium carbonate into the body of the diatomaceous earth which has been placed into the solution of magnesium bicarbonate before the whole is boiled. In consequence, the silica of the diatomaceous earth is present at the time the magnesia is in the most active condition to react.

A further advantage in this method of preparation is that it is not necessary to make as concentrated a solution of magnesium bicarbonate as usual; in fact, it may even be necessary to add additional water at the time that the diatomaceous earth is added in order to form a mixture that is fluid enough for molding. It is very difficult to obtain concentrated solutions of magnesia, and, therefore, the fact that this is not required is a material advantage, as it reduces the cost of handling and, therefore, the cost of production. Repeated pumping, pressing and rehandling of a suspension of basic magnesium carbonate causes the resultant dried material to become denser. This is due to the fact that the fragile particles become broken, resulting in a composition of lower insulating value.

In either of the methods of preparation it is important that the diatomaceous earth and the hydrated basic magnesium carbonate be thoroughly and uniformly mixed before molding. The quantity of magnesia that interacts with the silica of the diatomaceous earth may be further increased by adding small quantities of alkali hydroxids to the solution or to the suspension, as the case may be. As the composition dries, part of the alkali will attack the silica of the diatomaceous earth and will further facilitate the combination of magnesia with the silica.

The following percentages have been found to give a satisfactory product:

Hydrated basic magnesium carbonate_____ 15% to 25%
Diatomaceous earth_____ 70% to 60%
Fiber_____ 15% —15%

These products are particularly suitable for the insulation of furnaces, etc., operated at high temperature where the ordinary magnesia products are disintegrated. Furthermore, our insulating material results in considerable economy in furnaces, etc., due to the fact that less refractory is needed, as this material can withstand high temperatures without appreciable loss in insulating value.

From the above description it will be seen that our composition, although formed of diatomaceous earth, hydrated basic magnesium carbonate and fibrous material, is not a simple mixture of those ingredients but a compound in which the component parts are not completely combined; part of the silica of the diatomaceous earth interacts with a certain amount of the magnesia of the basic carbonate present to form a magnesium silicate. It may be further remarked that in our method of preparing the thermal composition the magnesia is handled considerably less, due to the fact that it does not need to be concentrated as highly as it would be for molding ordinary 85% magnesia composition.

We claim:

1. A heat-insulating material formed of diatomaceous earth, hydrated basic magnesium carbonate and fibrous material in proportion substantially as specified.

2. A heat-insulating material containing diatomaceous earth, hydrated basic magnesium carbonate, magnesium silicate, and fibrous material, the magnesium silicate being formed by the interaction of a portion of the magnesium of the basic carbonate with the silica of the diatomaceous earth.

3. A heat-insulating material containing diatomaceous earth, basic magnesium carbonate, and magnesium silicate resulting from the interaction of a portion of the magnesium of the basic carbonate with the silica of the diatomaceous earth.

4. A method of forming heat-insulating material which consists in precipitating a hydrated basic magnesium carbonate in the presence of diatomaceous earth.

5. A method of producing heat-insulating materials which consists in heating magnesium bicarbonate in the presence of diatomaceous earth to precipitate a basic carbonate in the presence of the diatomaceous earth.

6. A method of producing heat-insulating material which consists in heating magnesium bicarbonate in the presence of diatomaceous earth and adding a hydroxid of an alkali while heating the bicarbonate.

7. A method for producing heat-insulating material which consists in precipitating a basic magnesium carbonate into diatomaceous earth in the presence of a hydroxid of an alkali to facilitate the formation of silicate of magnesium.

8. A method of producing heat-insulating material which consists in forming a suspension of a hydrated basic magnesium carbonate, and adding diatomaceous earth to said suspension while the same is hot.

9. A method of producing heat-insulating material which consists in forming a suspension of a hydrated basic magnesium carbonate, adding a hydroxid of an alkali thereto, and adding diatomaceous earth and fiber to the suspension while it is hot to produce a material ready for molding.

PERCY A. BOECK.
WALTER L. JORDAN.